J. J. JOHNSTON.
PROCESS AND APPARATUS FOR TANNING.
No. 182,198. Patented Sept. 12, 1876.
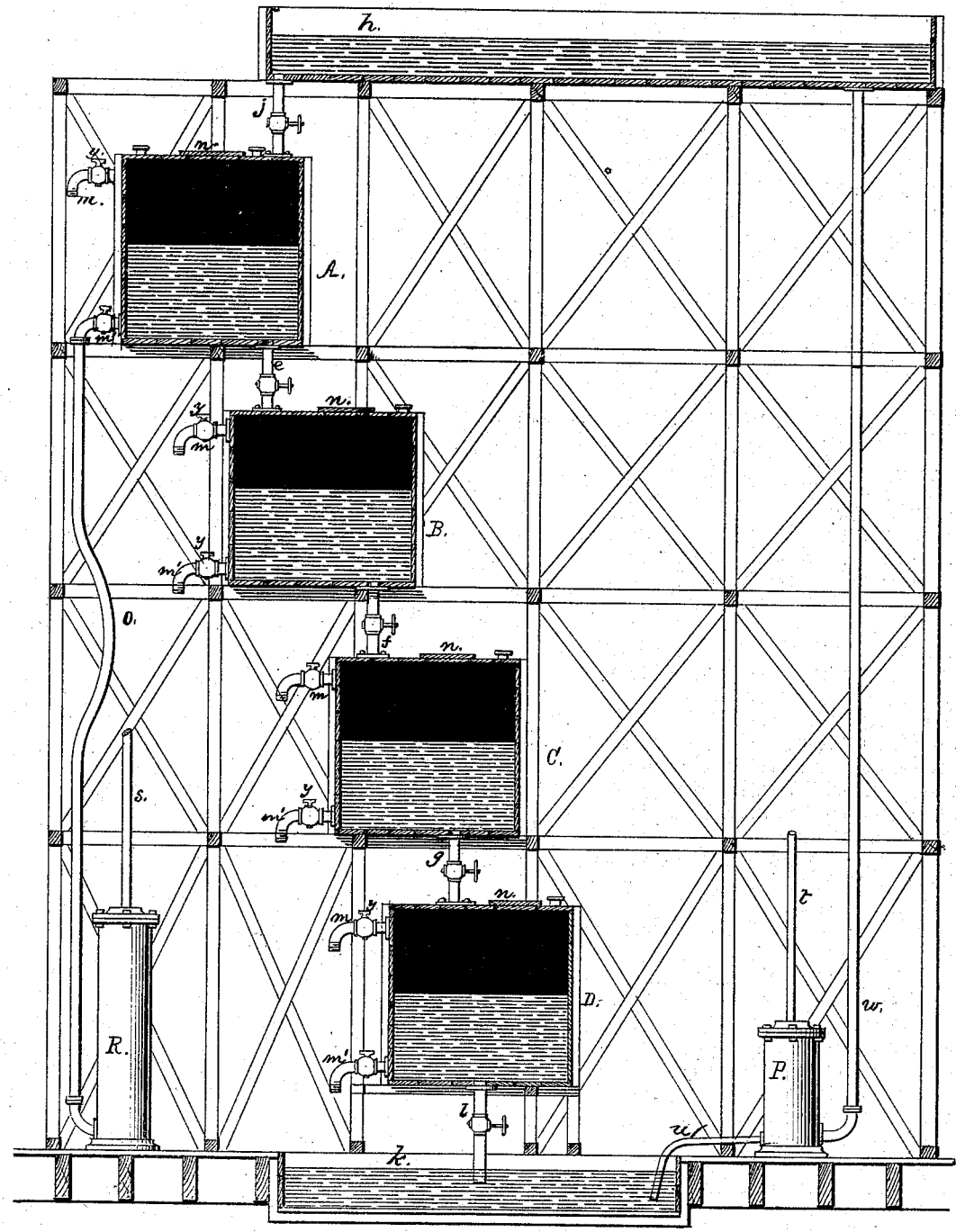
Attest;
Wm. W. S. Dyre.
Edw. F. Brown.
Inventor;
James J. Johnston

UNITED STATES PATENT OFFICE.

JAMES J. JOHNSTON, OF COLUMBIANA, OHIO.

IMPROVEMENT IN PROCESSES AND APPARATUS FOR TANNING.

Specification forming part of Letters Patent No. 182,198, dated September 12, 1876; application filed March 10, 1876.

*To all whom it may concern:*

Be it known that I, JAMES J. JOHNSTON, of Columbiana, Columbiana county, in the State of Ohio, have invented a certain new and useful Improvement in Apparatus for and Process of Tanning; and I do hereby declare that the following is a full, clear, and exact description thereof, reference being had to the accompanying drawing, and to the letters of reference marked thereon.

The skins of animals commonly used in the manufacture of leather are found, under the microscope, to be filled with small cells, and the death of the animal causes these cells to be filled with a glutinous secretion which is almost impervious to the watery solution containing tannin used in the process of tanning, and greatly impedes the chemical action of the tannin upon the skins immersed in the said solution.

My invention has for its object the freeing of the cells in the skin of the animal from this glutinous secretion, and facilitating the process of tanning. To accomplish this desirable result I immerse the hides in a solution consisting of water and tannic acid, heated to blood heat, in air-tight vats, keeping them for a part of the time *in vacuo*, and the other part of the time agitating the solution in which they are immersed by an air-blast, and changing the solution from one vat to another throughout the series.

To enable others skilled in the art to make and use my invention, I will proceed to describe more fully my improved apparatus and process of tanning.

In the accompanying drawing, which forms part of my specification, A, B, C, and D represent a series of vats, arranged one above the other, supported upon suitable trestle-work, and communicating with each other by pipes $e, f,$ and $g$. The upper vat communicates with a reservoir, $h$, through the medium of the pipe $j$, and the lower vat with a reservoir, $k$, by the pipe $l$. The connecting-pipes $j, e, f, g,$ and $l$ are each provided with a stop-cock. Each vat is provided with coupling-pipes $m$, and each of said coupling-pipes with a stop-cock. Each vat is also provided with an opening, $n$, which opening is closed with a suitable lid. R represents an air-pump, which can be used for the purpose of forcing air into the vats, or for exhausting it from them, to which is attached a flexible pipe, $o$, which may be made of india-rubber or other flexible material, so that it may be connected at the will of the operator to any of the coupling-pipes $m$. P represents a pump, to which is attached a pipe, $u$, communicating with the reservoir $k$, and a pipe, $w$, communicating with the reservoir $h$. The pumps R and P are operated by attaching their pistons $s$ and $t$ to suitable operating gear and power. The vats and reservoirs are constructed of wood, care being taken to have them made strong and the joints perfectly tight.

In making the tanning-liquor I grind hemlock, oak, or other suitable bark containing tannin, and place it in macerating-casks, adding sufficient water to extract the tannin from the ground bark, and then draw off the liquid into the tank $h$, to which may be added a very little sulphuric acid, or its chemical equivalent, the greatest amount of sulphuric acid being used for tanning sole-leather, care being taken to thoroughly mix the sulphuric acid with the liquor containing the tannin. It is then heated to blood heat through the medium of steam-pipes or other suitable means.

The skins of the animals are treated in the usual manner for removing the hair, &c., after which they are spread out in the vats, filling them to about one-third ($\frac{1}{3}$) of their depths. The vats are then sealed, and the tanning-liquor is allowed to flow from the tank $h$ through the pipe $j$ into the vat A, and from vat A through the pipe $e$ into the vat B, and from vat B through the pipe $f$ into the vat C, and from vat C through the pipe $g$ into the vat D; and when the skins or hides are covered to the depth of about twelve inches the valves in the pipes $j, e, f,$ and $g$ are closed, after which the elastic pipe or hose is attached consecutively to the upper coupling-pipe $m$ of each vat, and the air exhausted therefrom. The valves $y$ are then closed.

When the skins have remained for twelve hours in the tanning-liquor *in vacuo*, the pipe or hose $o$ is attached consecutively to the coupling-pipe $m'$ of the vats, and air is forced into the liquor in the vats for the purpose of agitating it, which agitation is kept up for about six hours. Before forcing air into the vats the valves of the upper coupling-pipes *m* should be opened. After the agitating process the air is again drawn from the vats consecutively by the means before stated, and the skins or hides are allowed to remain at rest in the tanning-liquor for another twelve hours, and thus the skins or hides are alternately at rest and agitated until the process of tanning is completed, which is accomplished in about eight or ten days.

The strength of the tanning-liquor should be kept as nearly as possible to a given standard, which is accomplished by drawing off a portion of the weakened liquor from the vats, and substituting stronger instead. The liquor is drawn from the vats into the reservoir *k*, from which it is carried back into the reservoir *h* through the medium of the pipes *u w* and pump P. After the weakened liquor is pumped from the reservoir *k* into the reservoir *h* its strength is increased to the proper standard by adding to it strong liquor drawn from the macerating-cask, and then adding the proper amount of sulphuric acid.

By arranging the vats one above the other, and connecting them by means of pipes, as described, the liqour, in the operation of being drawn off from one vat to another, will be so agitated as to be thoroughly mixed, (the stronger liquor always settling to the bottom of the vat,) and this agitation will also loosen the hides one from the other.

The operation of drawing off weakened liquor and adding stronger should be done as often as once in every twelve hours.

After the skins or hides have undergone the tanning process hereinbefore described, they are manipulated and treated by the currying process.

Having thus described my improvement in process for tanning, what I claim as of my invention is—

1. The described process of tanning, consisting in immersing the skins or hides in the hereinbefore-described tanning-liquor *in vacuo* for a period of time, and subsequently subjecting the said liquor and skins or hides to an air-blast, substantially as and for the purpose set forth.

2. The vats A, B, C, and D, provided with coupling-pipes *m*, and arranged one above the other, and communicating with each other by pipes *e, f*, and *g*, in combination with an air-pump, R, and reservoirs *h k* and pump P, substantially as herein described, and for the purpose set forth.

JAMES J. JOHNSTON.

Witnesses:
   WM. W. S. DYRE,
   EDM. F. BROWN.